United States Patent
Nemoto et al.

(10) Patent No.: US 7,978,727 B2
(45) Date of Patent: Jul. 12, 2011

(54) ETHERNET FRAME AND SYNCHRONOUS OPTICAL NETWORK (SONET) FRAME CONVERTIBLE INTERFACE DEVICE AND FRAME TRANSMISSION METHOD

(75) Inventors: Sachiko Nemoto, Yokohama (JP); Sumio Koseki, Sendai (JP)

(73) Assignee: Fujitsu Limited, Kawasaki (JP)

( * ) Notice: Subject to any disclaimer, the term of this patent is extended or adjusted under 35 U.S.C. 154(b) by 1183 days.

(21) Appl. No.: 10/728,938

(22) Filed: Dec. 8, 2003

(65) Prior Publication Data
US 2004/0146058 A1 Jul. 29, 2004

(30) Foreign Application Priority Data
Dec. 12, 2002 (JP) .................................. 2002-360594

(51) Int. Cl.
*H04J 3/22* (2006.01)
(52) U.S. Cl. ...................................................... 370/466
(58) Field of Classification Search .................. 370/466, 370/467
See application file for complete search history.

(56) References Cited

U.S. PATENT DOCUMENTS

| | | | |
|---|---|---|---|
| 6,650,646 B1 | 11/2003 | Galway | |
| 6,804,248 B1 * | 10/2004 | Tomar et al. | 370/401 |
| 7,031,252 B1 * | 4/2006 | Hosler et al. | 370/217 |
| 7,031,324 B1 * | 4/2006 | Goody | 370/401 |
| 2001/0043603 A1 * | 11/2001 | Yu | 370/393 |
| 2002/0110087 A1 * | 8/2002 | Zelig et al. | 370/236 |
| 2002/0176450 A1 * | 11/2002 | Kong et al. | 370/539 |
| 2003/0016697 A1 * | 1/2003 | Jordan | 370/466 |
| 2003/0056017 A1 * | 3/2003 | Gonda | 709/251 |
| 2003/0076857 A1 * | 4/2003 | Morita et al. | 370/466 |
| 2003/0117952 A1 * | 6/2003 | Ueno et al. | 370/228 |
| 2004/0076168 A1 * | 4/2004 | Patenaude | 370/406 |
| 2005/0175004 A1 | 8/2005 | Russell | |

FOREIGN PATENT DOCUMENTS

| | | |
|---|---|---|
| JP | 9507731 | 8/1997 |
| JP | 2000115106 A | 4/2000 |
| JP | 2002290473 | 10/2002 |

* cited by examiner

*Primary Examiner* — Chirag G Shah
*Assistant Examiner* — Salvador E Rivas
(74) *Attorney, Agent, or Firm* — Murphy & King, P.C.

(57) ABSTRACT

An apparatus for decreasing the hardware load from L2 switch MAC address learning for Ethernet-Over-SONET technology that uses VLAN, simplifying frame transmission between Ethernet and SONET, and improving the reliability of each device is disclosed. An Ethernet frame and SONET frame convertible interface part establishes a register that holds an Ethernet frame specific VLAN ID and SONET frame specific STS path ID in opposition, and a multiplexing part that multiplexes an Ethernet frame having a specific VLAN ID corresponding to a specific STS path ID that is held by a register among an input plurality of Ethernet frame VLAN ID's.

3 Claims, 9 Drawing Sheets

PRIOR ART

PRIOR ART

ETHERNET FRAME AND SYNCHRONOUS OPTICAL NETWORK (SONET) FRAME CONVERTIBLE INTERFACE DEVICE AND FRAME TRANSMISSION METHOD

FIELD OF THE INVENTION

The present invention relates to an Ethernet that utilizes SONET (Synchronous Optical Network: Synchronous Optical Network) path or Ethernet (registered trademark) frame interface technology, and more specifically relates to an interface device, SONET multiplex isolation device, transmission system and frame transmission method that is suitable for use with an interface that uses a 1-to-N path by branching to a plurality of individual SONET frames from 1 Ethernet frame.

BACKGROUND OF THE INVENTION

Recently, data transmission that uses the Ethernet has dramatically increased. Increasingly, services of the wide-range Ethernet are widely offered since the wide-range Ethernet of SONET base utilizes a previous network. Thus, Ethernet over SONET technology with mapping of SONET data traffic is required.

FIG. 8 is a schematic structural diagram of a frame transmission system 500. In the frame transmission system 500, shown in FIG. 8, for example, a client terminal 43 of a personal computer can utilize Ethernet over SONET transmission using a long distance LAN (Local Area Network) or latter-mentioned VLAN (Virtual Local area Network Virtual LAN, Virtual LAN), and provides a ring transmission circuit 50f that comprises an optical fiber, SONET multiplex isolation devices 500a-500d that interface between each Ethernet interface and SONET interface, and LAN switches 400a-400d that correspond to the Ethernet. Further, a SONET multiplex isolation device is also called a SONET-ADM (Synchronous Optical NETwork and Add and Drop Multiplex [Synchronous Optical NETwork and Add&Drop Multiplexer]) device, ADM device, ADM or ADM node, below, without any specifically determined limits, called simply ADM node.

The transmission rate of the frame transmission system 500 is OC (Optical Carrier) 48. This OC-48 has a plurality of transmission rates OC-1, and OC-3 that are defined for North American digital hierarchy. Further, a container capacity (simply container) for transmission of information data for each transmission rate. The container capacity between the ADM node 500a and ADM node 500b that are shown in FIG. 8 are STS (Synchronous Transport Signal)—3c, the container capacity between ADM node 500a and ADM node 500c and between ADM node 500a and ADM node 500d are defined, respectively, as STS-3c ×2 and STS-1.

Thus, the Ethernet frame that is sent from server 41 is converted to a SONET frame in an ADM node 500a, the SONET frames are respectively transmitted to ADM node 500b~ADM node 500d via ring transmission circuit 50f, then received by each client terminal 43.

Further, the frame transmission system 500 uses a UPSR (Unidirectional Path Switched Ring) for protection. This UPSR employs of a ring transmission circuit 50f switching method, and transmitting side ADM nodes 500a~500d send identical SONET frames by 2 channels of clockwise and counter-clockwise directions of a ring transmission circuit 50f, and the receiving side ADM nodes 500a~500d. Thus, ADM nodes 500a~500d are switched through a path that is specified for ring transmission circuit 50f when information is detected that is commonly known as broken or deteriorated that is contained in the received SONET frame.

Then, each ADM node 500a-500d has a SONET interface part (omitted from the figures) and an Ethernet interface part. FIG. 9 is a block diagram of the Ethernet over SONET interface part during 2 switch use. The Ethernet interface part 130 that is shown in this FIG. 9 provides a 1 gigabit Ethernet card (GbE: 1 Giga Bit Ethernet Card) 10e an optical-electrical conversion part 10d that mutually converts Ethernet frame and SONET frame from this 1 gigabit Ethernet card 10e, a SONET frame, a transmission frame transmitting part 135 that sends a plurality of SONET frames by switching to 1-to-N, a $1^{st}$ STS interface part 10a with mapping of N types of SONET frames that are switched for a time slot having a format of things like STS 1, a selector 10c that selects a local address SONET frame from the time slots and the frame receiving part 136 that isolates that selected SONET frames in plurality.

Thus, in the frame transmitting part 135, an input 1 Ethernet frame is switched to N SONET paths by a 1-to-N switch part 131a and STS path ID (Identification) of 1-to-N (point-to-multipoint:Point to Multipoint) is imparted by encapsulating by a plurality of multiplexing parts 117. Thus, SONET frames from the plurality of multiplexing parts 117 are output to a ring transmission circuit 50 based on STS-1 units by a 1st STS interface part 10a.

Further, a time slot of a local ADM node address in a selector 10c of frame receiving part 136 and the SONET frame that is isolated by isolating a SONET frame of the time slot is output by this. Thus, a SONET frame format with that isolation is processed.

Previously, layer 2 switch was used for copying or isolating the transmitted frames to a plurality of Ethernet ports from 1 Ethernet port that is established for each LAN switch 400a~400d when the LAN switches 400a~400d output an Ethernet frame for server 41 or client terminal 43.

The L2 switch also manages the applications of the upper position layer above the data link layer that is an OSI layer, and SONET frames are transmitted that have a plurality of tags within the STS path ID when a common L2 switch is used. Also, a common LAN switch manages the layers lower than the data link layer (L2:Layer2).

This L2 switch has a bridge function and performs address learning and filtering in an L2 switch inner part by using a MAC frame MAC (media Access Control) address (Transmission origin address SA [Source Address]). The L2 switch determines whether or not the received frames are transmitted to the sending terminal of the individual ones with bridge connections when a MAC address is read out by this learning. The L2 switch confirms whether or not that MAC address is registered in an inner part MAC address table (address List) and determines things like the multicast of the received frame for the device or terminal that is affiliated with the same VLAN when this is unregistered. Further, long distance LAN is realized using SONET protocol and wide-range Ethernet can be realized.

Thus, the uses of VLAN for Ethernet over SONET are many. VLAN and common LAN both use a plurality of client terminals 43 that are physically connected. The addresses of a plurality of client terminals 43 that are physically connected in a common LAN are confirmed by L2 switch.

Previously, a plurality of user-side devices among the proposed technology used previous LAN adapters. The mutual connection via ATM networks is possible, and the network entirety which contained an ATM switch structure is made such as functioning as one VLAN.

A computer communication network has ATM switches connected to respective LAN interface adapters by interface devices and the interface applies LAN frames to transmission use by ATM networks. Thus, the user side devices can communicate with transmittable wide area networks via these LAN interfaces adapters.

SUMMARY OF THE INVENTION

Transmitting and receiving Ethernet frames that use L2 switches with MAC address that learn the received frame and transmitted frame stored in the L2 switch inner part as digital data of a routing table (omitted in figures) is necessary. Thus, the L2 switch must have things like an MPU (Micro Processing Unit), LSI (Large Scale Integration) and buffer memory; further, the mechanisms of things like the MPU are complex. Therefor, the L2 switch having a large load produced by the hardware is a problem.

Also, the ability to simply identify with a VLANID (VID) that is previously defined as a STS path ID is desirable when there is encapsulating of Ethernet frames when supporting things like ADM node 500a. Additionally, the improvement of the reliability of each device in a network is desirable.

In the present invention it is desirable to simplify the frame transmission between the Ethernet and SONET by decreasing the load of the hardware for the MAC address learning of the L2 switches in Ethernet over SONET technology that uses VLAN, and the improvement of the reliability of each device due to being done by taking problems such as these into consideration.

Thus, an interface device of the present invention is characterized by an Ethernet frame and SONET frame convertible interface device being constituted by establishing a 1st holding part with a specific VLAN identifier of an Ethernet frame and a specific STS path identifier of a SONET frame held in opposition, and a multiplexing part that multiplexes the Ethernet frames having a specific VLAN identifier corresponding to a specific STS path identifier that is held in a 1st holding part among an input plurality of Ethernet frame VLAN identifiers (Claim 1).

Further, an interface device of the present invention comprises an Ethernet frame and SONET frame convertible interface device establishes a 2nd holding part with a specific STS path identifier of a SONET frame and a specific VLAN identifier of an Ethernet frame held in opposition. An isolation part that imparts a VLAN identifier that corresponds to a STS path identifier is held in a 2nd holding part to an extracted plurality of Ethernet frames by extracting each Ethernet frame and SONET frame STS path identifier from frames originating in the SONET frames with a plurality of Ethernet frames multiplexed.

Also, a SONET multiplex isolation device of the present invention comprises a SONET multiplex isolation device. The device includes an Ethernet interface device and SONET interface device including an Ethernet interface device establishing a 1st holding part with a specific VLAN identifier of an Ethernet frame, and a specific STS path identifier of a SONET frame held in opposition. Also included is a multiplexer part that multiplexes an Ethernet frame having a specific VLAN corresponding to a specific STS path identifier that is held by a 1st holding part among an input plurality of Ethernet frame VLAN identifiers.

The transmission system of the present invention preferably has a 1st SONET multiplex isolation device among a plurality of SONET multiplex isolation devices wherein a 1st holding part with a specific VLAN identifier of an Ethernet frame and a specific STS path identifier of a SONET frame held in opposition, and a multiplexing part that multiplexes a plurality of Ethernet frames having a specific VLAN identifier corresponding to a specific STS path identifier that is held in a 1st holding part among an input plurality of Ethernet frame VLAN identifiers are established, along with a 2nd SONET multiplexing isolation device among a plurality of SONET multiplex isolation devices wherein a 2nd holding part with a specific STS path identifier of a SONET frame and a specific VLAN identifier of an Ethernet frame are held in opposition, and an isolation part that imparts a VLAN identifier corresponding to a STS path identifier that is held in a 2nd holding part in each Ethernet frame that is extracted by extracting each Ethernet frame originating in a SONET frame and an STS path identifier of a SONET frame are established for a transmission system wherein a plurality of SONET multiplex isolation devices with an Ethernet interface device and SONET interface device are established.

Also, a frame transmission method of the present invention has a frame transmission method for an Ethernet frame and SONET frame convertible interface device and multiplexing transmitted Ethernet frames by transmitting Ethernet frames having specific VLAN identifier among a plurality of Ethernet frames by input of a plurality of Ethernet frames.

As discussed below, the effects and applications are as below when done as an interface device, SONET multiplex isolation device, transmission system, and frame transmission method of the present invention.

In one embodiment, an interface device of the present invention, by being constituted by establishing a 1st holding part that holds an Ethernet frame specific VLAN identifier and a SONET frame specific STS path identifier in opposition, and a multiplexing part that multiplexes an Ethernet frame having a specific VLAN identifier corresponding to a specific STS path identifier that is held in a 1st holding part among an input plurality of Ethernet frame VLAN identifiers for an Ethernet frame and SONET frame convertible interface device, the constitution of an interface can be simplified, and an improvement of the reliability can be expected.

In one embodiment, a multiplexing part establishes a filtering part that passes through Ethernet frames having a specific VLAN identifier among a plurality of Ethernet frames and a 1st encapsulating part that encapsulates information data contained in an Ethernet frame that passes through a filtering part. When done like this, simpler VLANID identification is possible since filtering is used without MAC address learning and the constitution can be simplified without the learning.

A multiplexing part is desirable as being constituted by establishing an ID inserting part that inserts a opposing SONET transmission device STS path identifier that opposes an Ethernet frame that is encapsulated by a 1st encapsulating part; when done in this way, frames can be reliably transmitted to opposing SONET devices, and address learning within a LAN switch is unnecessary.

A multiplexing part is also desirable to establish a flag inserting part that inserts a flag which indicates an input side Ethernet frame transmission fault in an Ethernet frame that is encapsulated by a 1st encapsulating part. When done like this, Ethernet side faults can be detected and the reliability of an interface device is improved.

When done as an interface device of the present invention, removal of frame encapsulating can be done simply by converting from STS path ID to VLANID since [this] is constituted by establishing 2nd holding part that holds a SONET frame specific STS path identifier and Ethernet frame specific VLAN identifier in opposition, and an isolation part that imparts a VLAN identifier corresponding to a STS path identifier that is held in a 2nd holding part to an extracted plurality of Ethernet frames by extracting each Ethernet frame and SONET frame STS path identifier from a SONET frame with a plurality of Ethernet frame multiplexed.

In one embodiment, the present invention may also be desirably constituted such as a plurality of Ethernet frames that are imparted by an isolation part being multiplexed in an Ethernet interface; when done in this way, the load to the hardware is decreased, the device constitution is simplified and an improvement is provided to the properties of the Ethernet interface part.

In another embodiment, a SONET multiplex isolation device with an Ethernet interface device and a SONET interface device is established, wherein an Ethernet interface device is constituted by establishing a 1st holding part that holds an Ethernet frame specific VLAN identifier and SONET frame specific STS path identifier in opposition, and a multiplexing part that multiplexes an Ethernet frame having a specific VLAN identifier corresponding to a specific STS path identifier that is held by a 1st holding part among an input plurality of Ethernet frame VLAN identifiers; thus a MAC address becomes unnecessary due to using an individual VLANID for each Ethernet frame.

When done as a SONET multiplex isolation device of the present invention, an Ethernet interface device is constituted by establishing a 2nd holding part that holds a SONET frame specific STS path identifier and an Ethernet frame specific VLAN identifier in opposition, and an isolation part that imparts a VLAN identifier corresponding to an STS path identifier that is held in the 2nd holding part to each extracted Ethernet frame by extracting each Ethernet frame and SONET frame STS path identifier from a SONET frame with a plurality of Ethernet frames multiplexed; thus, for example, a reliably indicated path can be transmitted to the receiving side by comparing VLANID and STS path ID.

When done as a transmission system of the present invention, a transmission system with a plurality of SONET multiplex isolation devices having an Ethernet interface device and a SONET interface device is established wherein a 1st SONET multiplex isolation device among a plurality of SONET multiplex isolation devices is constituted by providing a 1st holding part that holds an Ethernet frame specific VLAN identifier and a SONET frame specific STS path identifier in opposition, and a multiplexing part that multiplexes a plurality of Ethernet frames having a specific VLAN identifier corresponding to a specific STS path identifier that is held in a 1st holding part among a plurality of Ethernet frame VLAN identifiers, along with a 2nd SONET multiplex isolation device among a plurality of SONET multiplex isolation devices by establishing a 2nd holding part that holds a SONET frame specific STS path identifier and an Ethernet frame specific VLAN identifier in opposition, and an isolation part that imparts a VLAN identifier corresponding to an STS path identifier that is held in a 2nd holding part to each extracted Ethernet frame by extracting each Ethernet frame and SONET frame STS path identifier originating in a SONET frame; thus, device reliability can be improved by an automatic shut-down function when there is a fault.

A 1st SONET multiplex isolation device multiplexing part inserting a flag that indicates an input side Ethernet frame transmission fault along with a 2nd SONET multiplex isolation device isolation part that prevents output of an Ethernet frame that should be transmitted by detection of a flag from a frame originating in a SONET frame is a desirable constitution; when done in this way, output of a transmission side Ethernet port of a receiving side SONET multiplex isolation device can be automatically shut-down when there is fault.

When done as a frame transmission method of the present invention, a frame transmission method for an Ethernet frame and SONET frame convertible interface device has a plurality of Ethernet frames input, Ethernet frames having a specific VLAN identifier among a plurality of Ethernet frames pass through, and the passed-through Ethernet frames are multiplexed to a SONET frame STS path identifier range; thus, frames can be reliably transmitted to an objective opposing transmission device, the device constitution is simplified, and property improvement of the Ethernet interface is provided since address learning within a LAN switch becomes unnecessary.

When done as a frame transmission method of the present invention, a SONET frame with a plurality of Ethernet frames multiplexed is received, each Ethernet frame and SONET frame STS path identifier are extracted from a frame originating in a multiplexed SONET frame, and a VLAN identifier corresponding to the extracted STS path identifier is imparted to each extracted Ethernet frame; thus, device reliability can be improved by an automatic shut-down function when there is a fault.

When done as a frame transmission method of the present invention, a frame transmission method for a transmission system that provides a plurality of SONET multiplex isolation devices has an Ethernet interface device and SONET interface device wherein a 1st SONET multiplex isolation device among a plurality of SONET multiplex isolation devices inputs a plurality of Ethernet frames, passes through Ethernet frames having a specific VLAN identifier among a plurality of Ethernet frames, multiplexes the passed-through Ethernet frames, and a 2nd SONET multiplex isolation device among a plurality of SONET multiplex isolation devices receives a SONET frame with a plurality of Ethernet frames multiplexed, extracts each Ethernet frame and SONET frame STS path identifier from a frame originating in a multiplexed SONET frame, and imparts a VLAN identifier corresponding to the extracted STS path identifier to each extracted Ethernet frame; thus, a plurality of SONET multiplex isolation devices can also branch MAC frames to each port without MAC address learning using only VLANID within each data frame and 1-to-N transmission becomes possible.

DETAILED DESCRIPTION OF THE PREFERRED EMBODIMENTS

Figure 1:
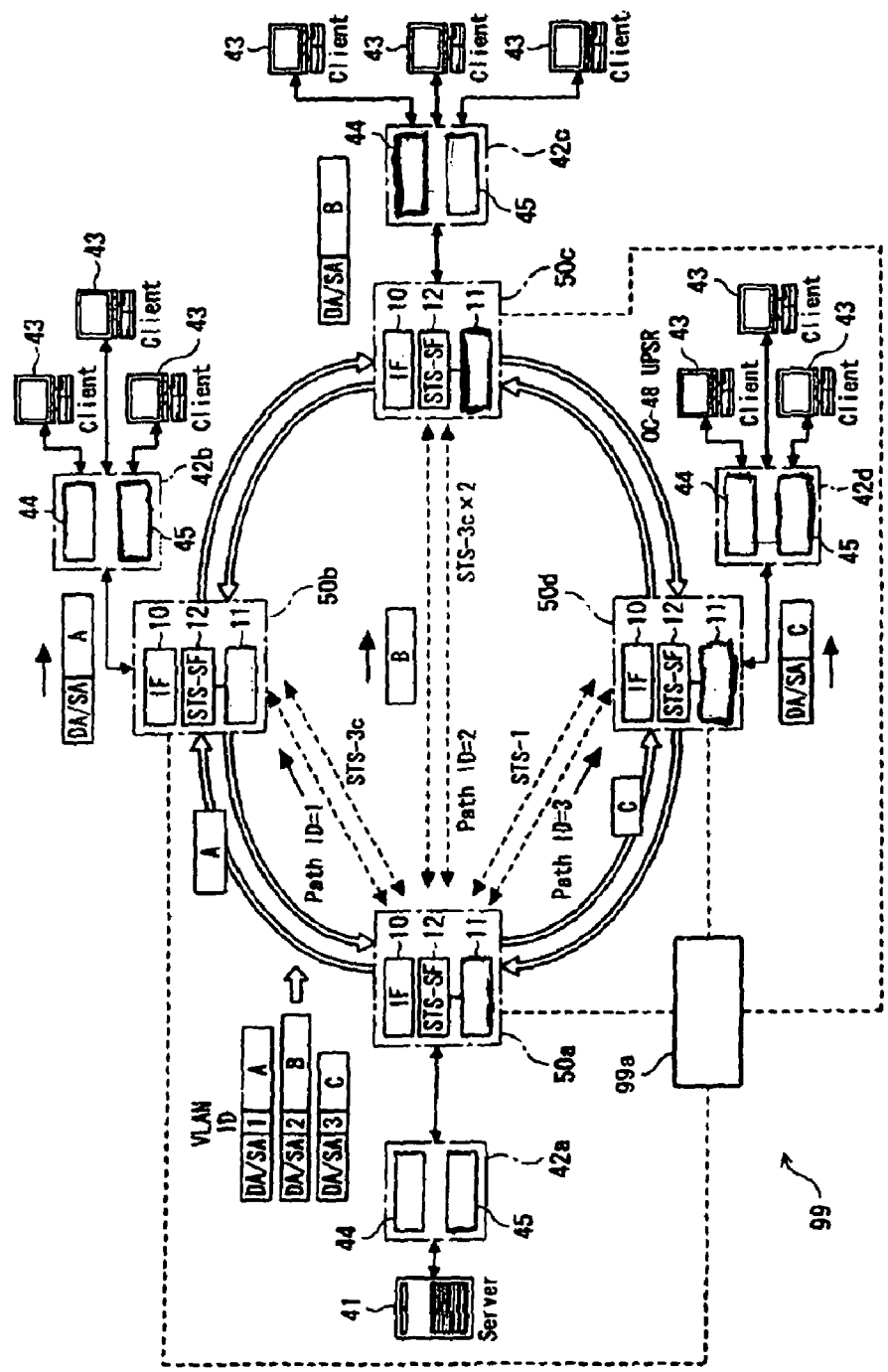
FIG. 1 is a schematic structural diagram of a frame transmission system according to the present invention.

FIG. 1 is a schematic structural diagram of an exemplary frame transmission system according to the present invention. The frame transmission system 99 shown in FIG. 1 provides an Ethernet interface part 10 and 44. ADM nodes (SONET multiplex isolation devices) 50a-50d preferably having this SONET interface part (SONET interface device). In one embodiment, an Ethernet frame that is input in any of these ADM nodes 50a-50d is encapsulated in a SONET frame with, a SONET, which is a synchronous optical network preferably has a STS path ID (STS path identifier) inserted. Thus, a SONET frame is transmitted to any of the other ADM nodes 50a~50d via ultra-high speed transmission of optical fibers (1-to-1 transmission), or transmitted to a plurality of ADM nodes of any other ADM node among the other ADM nodes 50a~50d (1-to-N transmission). Thus, a wide-range Ethernet is formed.

In one embodiment, the frame transmission system 99 provides a ring transmission circuit 501 that transmits SONET frames, ADM nodes 50a~50d that are established in ring transmission circuit 50f, and LAN switches 42a~42d that are respectively connected of to ADM nodes 50a~50d. A client terminal 43 that is operatively connected to LAN switches 42b~42d is also desirable. Finally, a network control device 99a that is operatively connected to ADM nodes 50a~50d may also be included.

(1) Server 41, Client Terminal 43

In one embodiment, a server 41 holds a plurality of files. The plurality of files, may be used by each of a plurality of a group that are virtually branched using VLAN. Also, a client terminal 43, for example, is similar to a portable terminal that is connected via a personal computer, work station, or wireless circuit (omitted from figures), and has frame transmitting and receiving functions.

It is desired that the server 41 and client terminal 43 have the function of inserting a VLANID, transmission source address (Source Address:SA), transmission destination address (Destination Address:DA) and information data in a transmitted Ethernet frame.

(2) LAN Switches 42a~42d

(2-1) Function of LAN Switch 42a and LAN Switches 42b~42d

In one embodiment, LAN switch 42a establishes a plurality of ports in both directions of the input and output sides of an Ethernet frame, Ethernet frames from server 41 or ADM node 50a are preferably switched (bridge) to, respectively, ADM node 50a or server 41 (Called "bridge function" below.). Further, LAN switch 42a inserts and outputs VLANID (for example, 1~3) which identifies each ADM node 50b~50d, in the Ethernet frames from server 41.

In this embodiment, the bridge function to the ADM node 50a produces N (The example that is shown in FIG. 1 is when N is 3.) Ethernet frames preferably copy 1 Ethernet frame from server 41 N Ethernet frames are output to ADM node 50a. Also, the bridge function to the server 41 allows the multiplexing and output of N Ethernet frames from ADM node 50a. Below, limits are not specifically determined for the N Ethernet frame multiplex and means the output to ports of 1 place, for example, of N plurality of Ethernet frames having the respective VLANID=1, 2, . . . , N.

The LAN switches 42b~42d preferably establish a plurality of ports in both directions of the input and output sides of the Ethernet frames. They output to 1 or more client terminals 43 by multiplexing N Ethernet frames from ADM nodes 50b~50d along with having a function of outputting N Ethernet frames to ADM nodes 50b~50d by copying 1 Ethernet frame from a plurality of client terminals 43 to N Ethernet frames.

In one embodiment, server 41 outputs, for example, 3 Ethernet frames (refer to FIG. 1) to LAN switch 42a. The output 3 Ethernet frames, respectively, contain 3 types of VLANID with data A, B, D. Thus, ADM node 50a transmits data A which contains STS path ID as previously assigned, between itself and the ADM node 50b. This preferably occurs when there is an ADM node 50b~50d address. Thus, ADM node 50b removes the STS path ID, when receiving one having the aforementioned STS path ID among the SONET frames, and transmits data A to client terminal 43. Further, data B and C also have the same as the transmission method as data A.

(2-2) LAN Switches 42a~42d Frame Transmitting Part

Figure 2:
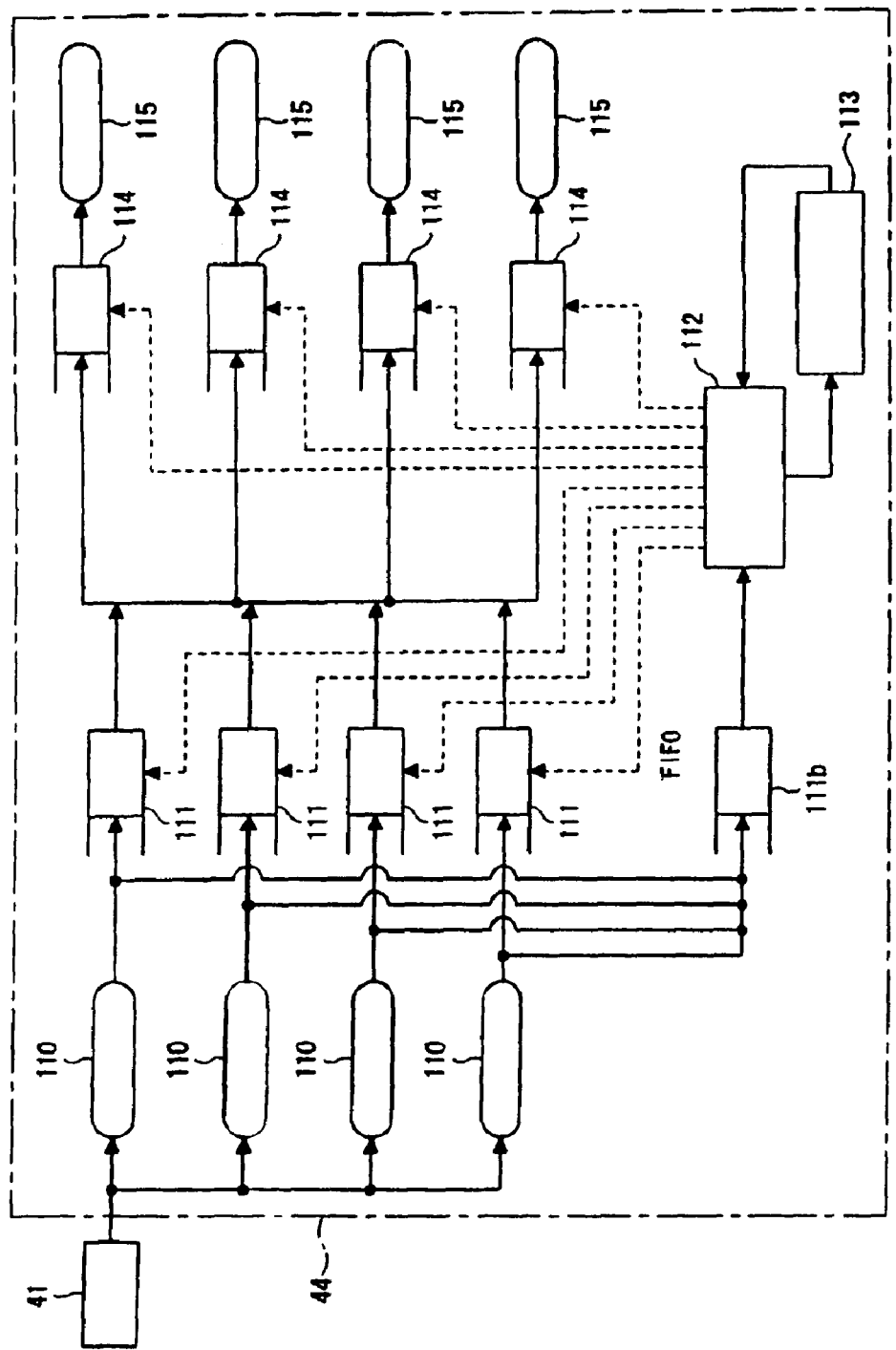
FIG. 2 is a diagram showing an exemplary LAN switch transmitting part in one embodiment of the present invention.

FIG. 2 is a figure that shows the essential parts of a frame transmitting part of a LAN switch 42a pertaining to an actual embodiment of the present invention; frame transmitting part 44 that is shown in this FIG. 2 is one that transmits Ethernet frames from a server 41, and is constituted by establishing, for example, 4 input Ethernet ports (Called "input port" below.) 110, packet buffers (Ethernet frame buffer) 111, 4 output buffers 114, 4 output Ethernet ports (Called "output ports" below.) 115, header FIFO buffer (Header First-In-First-Out buffer) 11b, network processor (Network Processor) 112 and routing table 113. Thus, input port 110, packet buffer 111, output buffer 114 and output port 115 from 1 transmission line, further, 4 transmission lines have a common network processor 112 and routing table 113.

In one embodiment, Ethernet frames from a plurality of circuits such as server 41, and client terminal 43, are input to input ports 110. It is desired that packet buffers 111 temporarily hold the Ethernet frame, while output buffers 114 hold the output format Ethernet frame. In one embodiment, the timing is adjusted by latter processing by establishing these packet buffers 111 and output buffers 114.

It is desired that output port 115 outputs Ethernet frames that are held by the output buffer 114. The header FIFO buffer 11b preferably holds or outputs the header of an Ethernet frame by using a first-in-first-out method. Routing table 113 holds routing information such as routing routes and functions as a learned table where the past routing results are considered to be "learned".

Network processor 112 preferably selects a routing route that has been learned by routing table 113 in each header region that is held in header FIFO buffer 111b, and writes routing information like the selected routing route.

A switching method for frame transmitting part 44 that is shown in FIG. 2 is further discussed. In one embodiment, a header writes to header FIFO buffer 111b when an Ethernet frame having a header, a VLANID, and data is input from input, port 110, VLANID and data. Both are then written into packet buffer 111. Thus, the network processor 112 reads out the VLANID that is held in the packet buffer 111 and the destination address that is contained in the header of the front of the head of the header FIFO buffer 111b and distributes to the 4 output ports 115. Therefore, 1-to-4 switching (Called simply "switching" below) is performed.

(2-3) LAN Switches 42a~42d Frame Receiving Part 45

Figure 3:
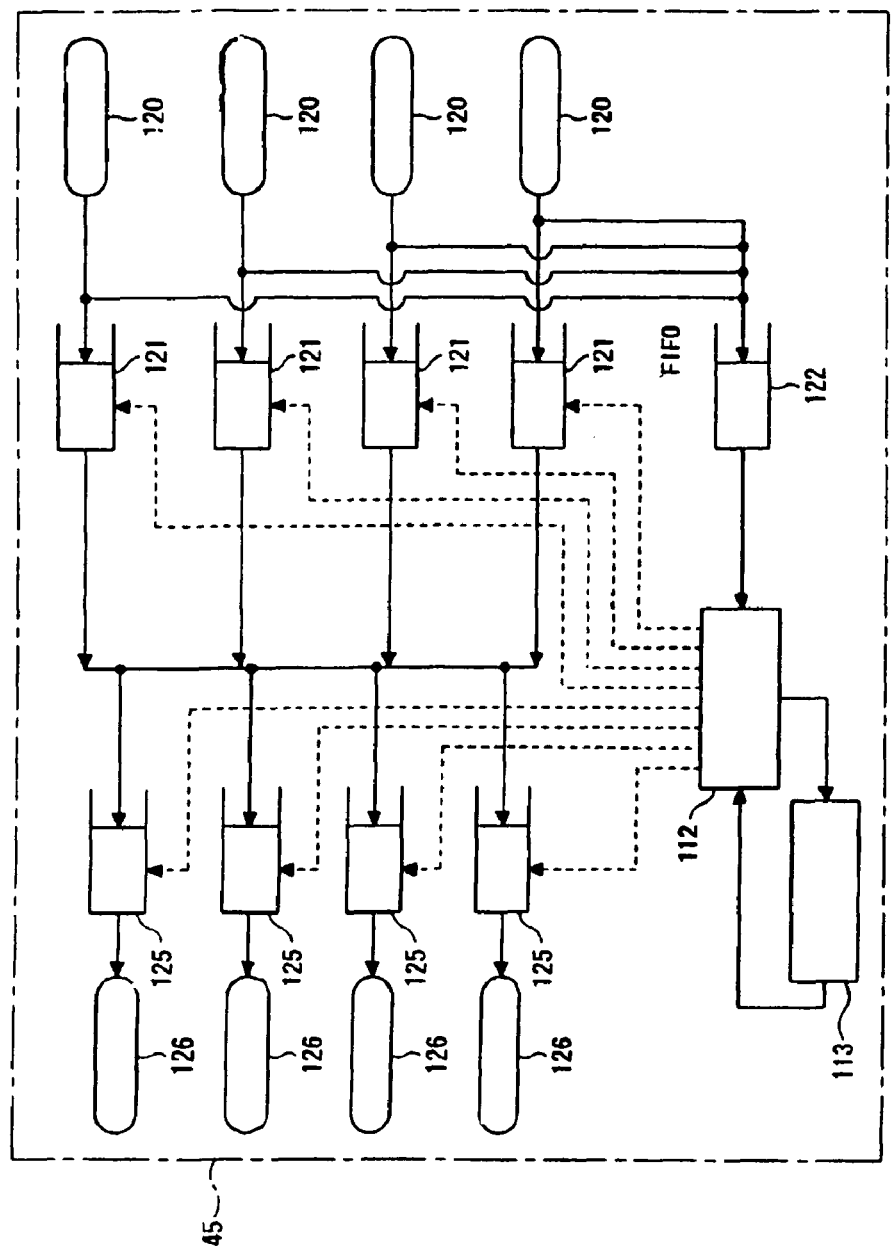
FIG. 3 is a diagram showing an exemplary LAN switch receiving part in one embodiment of the present invention.

FIG. 3 is a diagram showing the exemplary parts of frame receiving part 45 of LAN switch 42a in one embodiment of the present invention. In this embodiment, frame receiving part 45, shown in FIG. 3, provides 4 input ports 120 that receive Ethernet frames from ADM nodes 50a (refer to FIG. 1), 4 input buffers 121 that temporarily hold received Ethernet frames that contain data and VLANID. Also included are 4 packet buffers 125 that hold a packet with header processing for Ethernet frames that are held in the 4 input buffers 121, 4 path output ports (output ports) 126 that output the packets that are held in the 4 packet buffers 125 and header FIFO buffer 122 that holds the headers.

Further, input port 120, input buffer 121, packet buffer 125 and path output port 126 function by receiving through 1 receiving line. They also receive along with 4 receiving lines that are common to header FIFO buffer 122, and network processor 112 and routing table 113.

Also, an identical code as the above-mentioned is displayed as identical by one other than these. Further, a complicated explanation of LAN switches 42b~42d is omitted since they are identical structures to LAN switch 42a.

In one embodiment, the Ethernet frames from each input port 120 are respectively written into input buffer 121. Each Ethernet frame header is written into header FIFO buffer 122. Also, network processor 112 reads out VLANID and header from input buffer 121 and header FIFO buffer 122, refers to routing table 113, and selects the path output port 126 that should output the frame. Thus, the network processor 112 generates a frame that is comprised of the header and data in packet buffer 125 and the generated packet is output from path output port 126 based on the communication route.

In one embodiment, the Ethernet frame from a server 41 that is added (Add) in ADM node 50a is transmitted to ADM node 50b, and the transmitted SONET frame is decapsulated by ADM node 50b and output from path output port 126.

In this way, the received Ethernet frame is transmittably processed in ADM node 50b, branched to the 3 directions of the path output port 126 and a wide-range VLAN can be realized.

(3) Simple Explanation of VLAN (3-1) VLAN Example

In one embodiment, VLAN groups client terminals 43 that are connected to a network. This may include affiliating with any group among a virtual plurality of groups without a relationship with things such as physical connections and structures of the client terminal 43. Further, a file is commonly used for each group of a plurality. This grouping method is performed by establishing a prior manager attachment to any group of a 1st group, 2nd group, . . . , Nth group for each client terminal 43. Thus, the grouping is realized according to a logical establishment.

Figure 4:
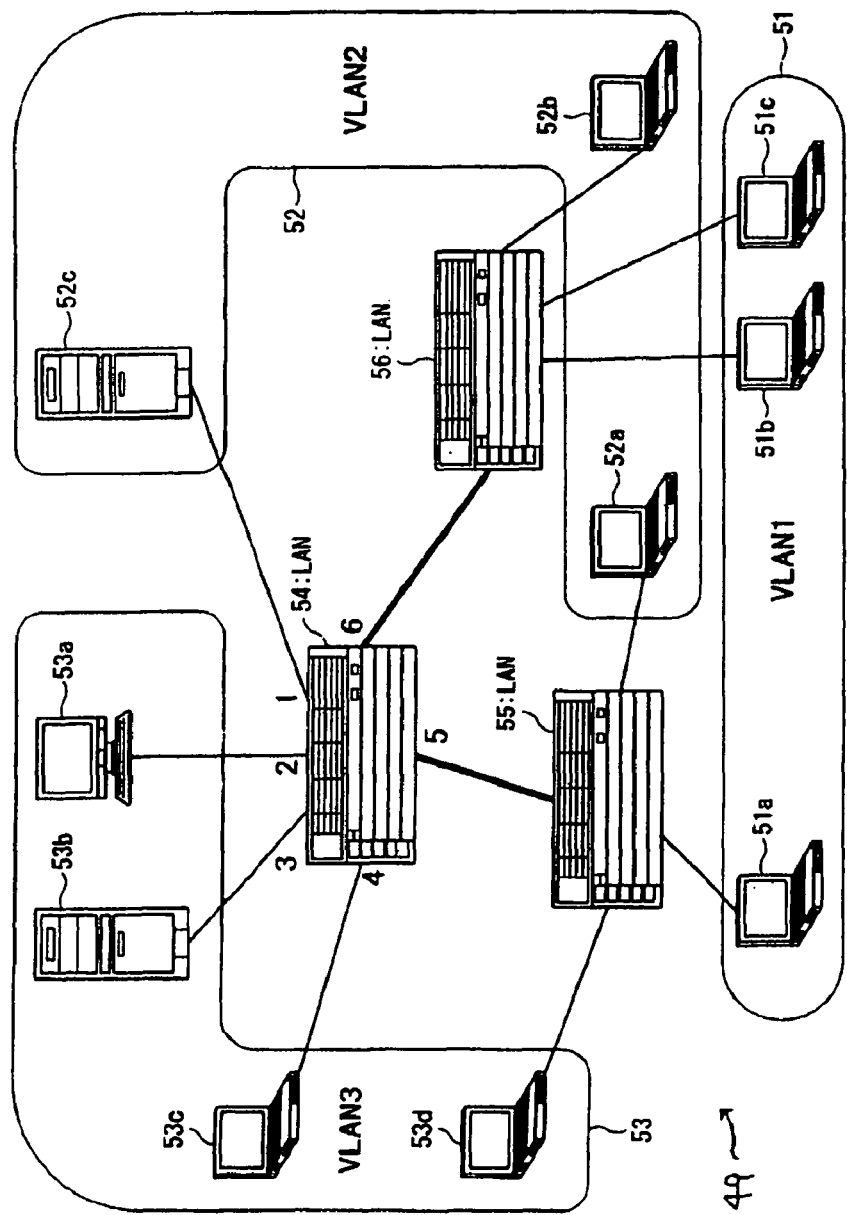
FIG. 4 is a diagram showing one example of VLAN.

FIG. 4 is a diagram that shows one embodiment of a VLAN. A VLAN 49, shown in FIG. 4, is a network enterprise that comprises establishing a company group (network) 53, company branch A group (network) 51, and company branch B group (network) 52.

In one embodiment, this group 53 has a LAN switch 54 that supports the VLAN, business client terminals 53a, 53b, research department client terminal 53c and client terminal 53d that is affiliated with the business department or research department. Further, group 51 has LAN switch 56 that supports VLAN, business department client terminal 51a, research department client terminals 51b and 51c. Also, group 52 has LAN switch 56 that supports VLAN, business department client terminals 52a, 52b and research department client terminals 52c. Also, LAN switches 54, 55, 56 have the same function as, respectively, LAN switches 42a~42d. Each client terminal 53a, 53b, 53c, 53d and 51a, 51b, 51c and 52a, 52b, 52c, all, have the same function as client terminal 43.

In this embodiment, when the LAN switches 54, 55 and 56 realize a common switch function, the LAN switch 4 confirms affiliation of each client terminal 53a~53d, 51a~51d, and 52a~52c with an similar network. Also, each client terminal 53a~53d, 51a~51d and 52a~52c can mutually communicate. Thus, the manager establishes client terminals 53a, 53b, 51a and 52a in a business group and establishes client terminals 53d, 51b, 51c and 52c in the research group.

Therefore, client terminals 53a, 53b, 51a and 52a, which are affiliated with the business group, can mutually communicate. The broadcast frames that are transmitted from these client terminal 43 can be broadcast to only client terminals 53a, 53b, 51a and 52a. 53d, 51b, 51c and 52c, which are affiliated with the research group, can also mutually communicate. The broadcast frames that are transmitted from the client terminals 43 can be broadcast to only client terminals 53d, 51b, 51c and 52c.

The client terminal 43 that is shown in FIG. 1 is also previously grouped by establishment by a manager, and mutual communications and broadcasting within a group can be realized.

In one embodiment, communication for client terminals 53a~53d, client terminals 51a~51c and client terminals 52b, 52c must be via a router (omitted from figures) that has a layer 3 function. The reason is due to the VLAN grouping being performed in a layer 2 MAC frame transmittable and receivable range.

Thus, a broadcast frame does not require a relay for client terminals 53a~53d, 51a~51c, 52a~52c (Called "client terminal 53a, etc." below. They are physically connected to client terminal 43 due to grouping for VLAN 49, which is shown in FIG. 4, and frame transmission system 99 (refer to FIG. 1). Thus, the network load is decreased and the security increases.

(3-2) 1-to-1 Connection and 1-to-N Connection

In one embodiment, a manager does not need to assign a VLANID to the LAN switches 54~56 when there is a 1-to-1 connection between a client terminal 53a, etc., shown in FIG. 4, and LAN switches 54~56. Also, the VLANID of the Ethernet frames that are input for client terminal 53a, etc. are similar. Thus, a tag is also unnecessary.

LAN switch 54 is connected in both directions to LAN switches 55 and 56 when there is a 1-to-N connection between LAN switches 54~56 and client terminal 53a, etc. Thus, an Ethernet frame that is transmitted and received by ports 2~4 of LAN switch 54 have 3 types of VLANID of client terminal 53d, client terminal 51a and client terminal 52a. Further, 3 types of Ethernet frames with different VLANID flow in via port 5 and LAN switch 55 for all ports 2~4 of LAN switch 54. Thus, LAN switch 54 multiplexes an Ethernet frame with the 3 types of VLANID. The multiplexed Ethernet frames are output to the client terminal 53a from port 2. Thus, client terminal 53a isolates each VLANID from the Ethernet frames with the 3 types of VLANID multiplexed.

These 1 to 1 connections and 1 to N connections are identical also for the frame transmission system 99 that is shown in FIG. 1. Thus, grouping can also use ports that are affiliated with a plurality of switches without being restricted when 1 switching hub is used, and, can be composite established such as being affiliated in a plurality of groups like port 3 which is shown in FIG. 4.

(3-3) Assignment of VLANID Using Port System

Various rules are known for assigning respective Ethernet frames and VLANID's. One rule for assigning VLANID is a method wherein a manager imparts one VLANID to each LAN switch port (port method).

In FIG. 4, ports having port numbers 2, 3, 4 of LAN switch 54, respectively, are connected to client terminal 53a, 53b and 53c that are affiliated with group 53. Further, the ports that have port numbers 5, 7 are respectively connected to LAN switch 55 and LAN switch 56. A manager assigns port 1 to group 52 in a LAN switch 54 of 6 ports, for example, and assigns ports 2, 3 to group 53 and ports 5, 6, respectively, in LAN switches 55, 56. Thus, a manager forms a group with a port as a unit.

Thus, a manager forms a VLAN group by establishment according to the LAN switches 54~56 when, respectively, modified to an establishment that supports VLAN and the server and files can be commonly used. In this way, the VLAN 49 can be seen such as being a simple network physically, an the realization is comprised of virtually 3 types of independent networks.

(4) ADM Nodes 50a~50d

In one embodiment, ADM nodes 50a~50d (refer to FIG. 1) are SONET multiplex communication devices with SONET applied. High speed and large capacity data can be transmitted and received, and there can be ATM (Asynchronous Transmission Mode) conversion, ATM multiplexing and low-speed data multiplexing, respectively, using identical ADM nodes 50a~50d. Also, each ADM node 50a~50d can have band switching of SONET paths and can support a plurality of circuit interfaces.

(5) SONET Path and STS Path ID Establishment

In one embodiment, a manager performs SONET path establishment manually or by using software for 1 (for example, ADM node 50a) among ADM nodes 50a~50d. A manager establishes a SONET path of ADM node 50a via network control device 99a (refer to FIG. 1). Thus, information pertaining to a time slot sequence, for example, is commonly known to ADM node 50a switch fabric (Also called SONET interface devices and STS-SF or STS switches) 12. Thus, network control device 99a performs circuit management and fault surveillance and various controls of frame communication system 99.

Further, STS path ID establishment, as one part of SONET path establishment, is performed manually by a manger or automatically, using software. The established STS path ID is received by a control interface part 99b inside ADM node 50a and written into things like the LSI register of each element (for example, the latter-mentioned registers 11a, 11b) inside ADM node 50a.

(6) ADM Node 50a~50d Structures

Figure 5:
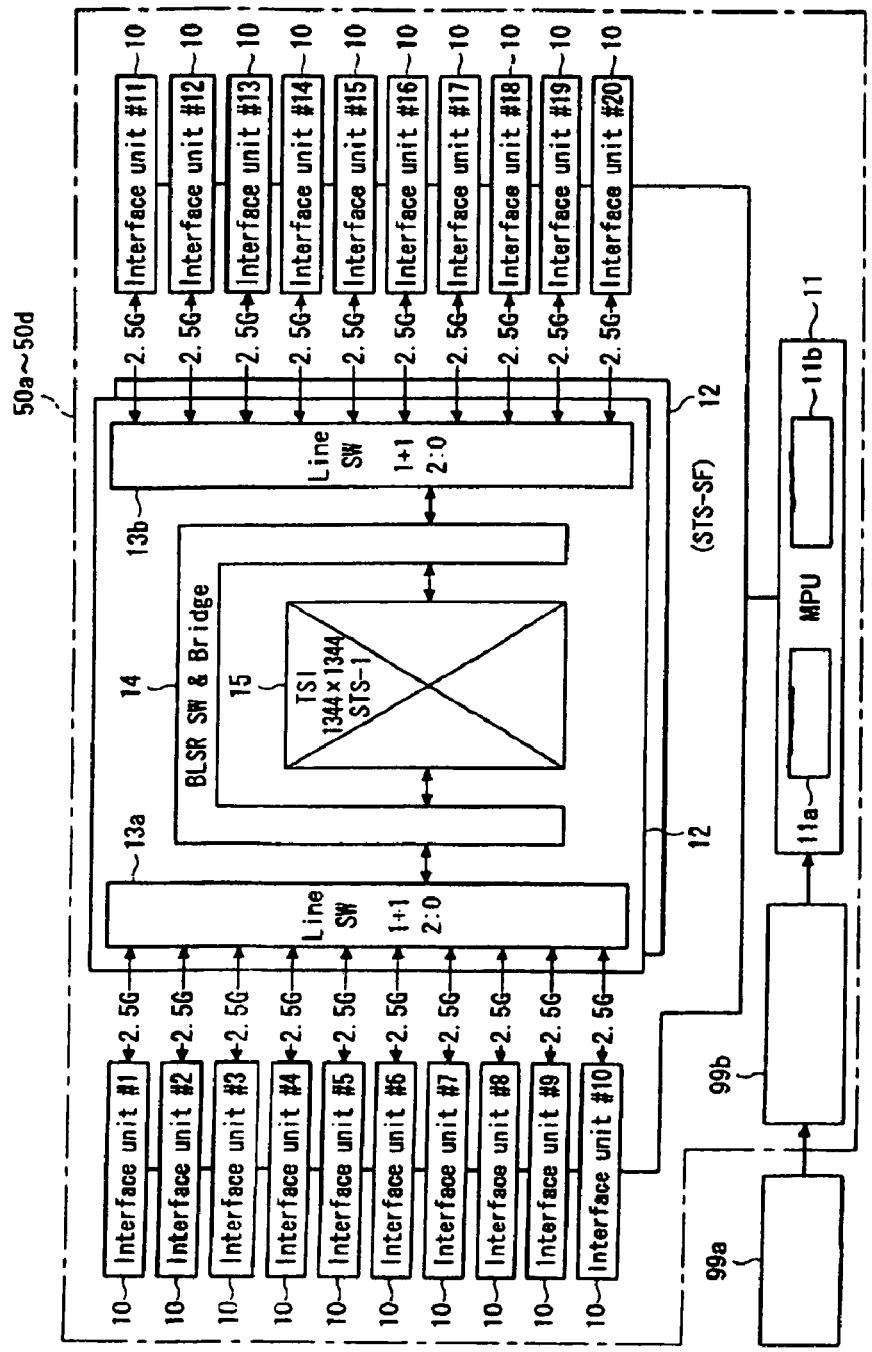
FIG. 5 is a block diagram of an ADM node in one embodiment of the present invention.

FIG. 5 is a block diagram of exemplary ADM nodes 50a~50d according to the present invention. The ADM nodes 50a~50d, shown in FIG. 5, comprise establishing, for example, 20 (#1~#20) Ethernet interface parts 10, control interface part 99b, control part 11 and a plurality of switch fabrics (STS-SF) 12.

In one embodiment, the function of the Ethernet interface part 10 is realized by, for example, an interface card, comprised of line interface cards #1~#10 and tributary interface cards #11~#20. Thus, a number of STS-1 frames is transmitted that correspond to the band of these interface cards between each line interface card #1~#10 and tributary interface cards #11~#20, thus, becomes as connected by a STS-1 unit via a switch fabric 12.

Control interface part 99b is one that receives VLANID from network control device 99a. Further, control part 11 is respectively connected with line interface cards #1~#10 and tributary interface cards #11~#20 and controls the action of each interface card #1~#20, being one that can hold the VLANID from control interface part 99b, has register (1st holding part) 11a and register (2nd holding part) 11b.

A plurality of switch fabrics 12, respectively, isolate Ethernet frames from SONET frames along with multiplexing input Ethernet frames to SONET frames, and are established corresponding to STS-1 units. These switch fabrics 12, respectively, are constituted by providing line switches 13a, 13b, switch part (BLSR switch & bridge) 14 and time slot interchange (TSD) 15.

In one embodiment, line switches 13a, 13b, respectively, are ones that convert Ethernet frames (electrical frames) that are output from each interface card #1~#20 to SONET frames (optical frames). For example, this function is realized by interface cards. Thus, the Ethernet frames of Ethernet interface cards #1~#20 are switched to SONET ring transmission circuit 50f by way of the interface cards (for example, OC-48 unit) of line switches 13a, 13b.

Further, the switch part 14 is one that switches the SONET frames that are input from the line switches 13, 13b based on a (BLSR (Bidirectional Line Switch Ring: Bi-directional Line Switch Ring) switch system. A ring communication circuit 50f is connected between ADM nodes 50a~50d using, respectively, in-use optical fiber and reserve-use optical fibers; the switch part 14 switches the communication direction of SONET frames when there are things like breaks in these optical fibers. Concretely, switch part 14 switches the in-use and reserve-use [fibers], executes things like communication direction conversion (for example, changing from counter-clockwise to clockwise) and performs line switching for reliable communication without breaking SONET frames.

Further, a time slot interchange 15 is one that adds a SONET frame that is switched by switch part 14 to ring communication circuit 50f. The time slot interchange 115 shifts the sequence (relative position from head of frame line) of 2 time slots 4, 12 among the 15 time slots 1~15, for example, that are included in the input frame row, and the frame line after shifting the time slot sequences 4 and 12 is output as an output frame line. This functions as a switch part (STS-SW). Further, the time slot interchange 15, is duplexed, and is constituted in the same way also for things like devices other than Ethernet interface part 10 (for example, SONET OC-3 interface part).

The register 11a holds the specific VLANID (previously established specific VLANID) of the Ethernet frame and specific STS path ID (previously established specific STS path ID) of the SONET frame in opposition, and the specific VLANID that is held in this register 11a is sent to the branching processing part 20 of the Ethernet interface part 10 that is discussed below. Thus, the register 11b holds the specific STS path ID of the SONET frame and the specific VLANID of the Ethernet frame in opposition. Below, the held content of the registers 11a, 11b are explained as being substantially similar.

Figure 6:
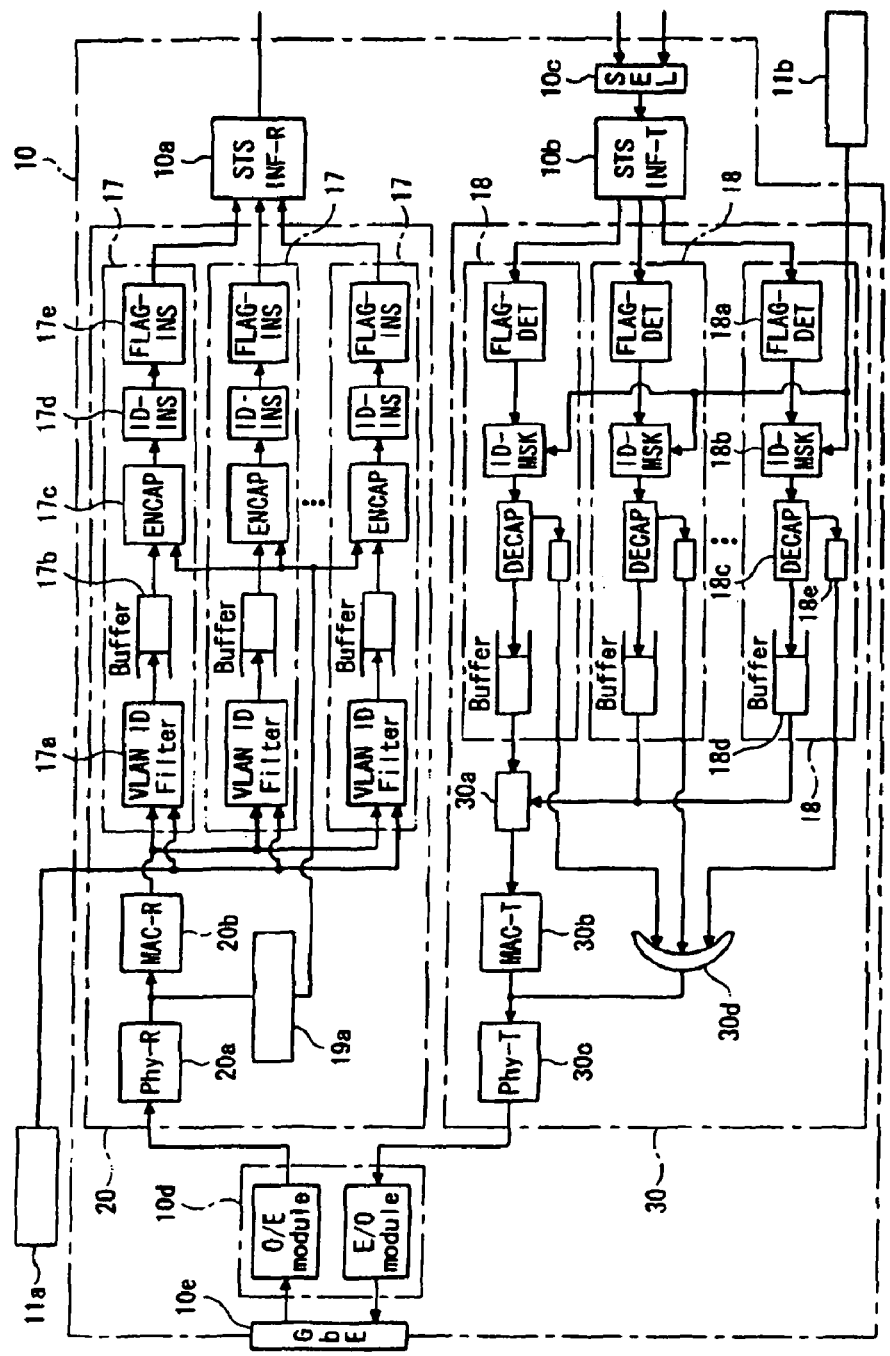
FIG. 6 is a block diagram of an exemplary Ethernet interface part.

Next, the constitution of an Ethernet interface part 10 is discussed using FIG. 6.

(7) Constitution of Ethernet Interface Part 10

FIG. 6 is a block diagram of an Ethernet interface part 10 according to the present invention. Ethernet interface part 10 that is shown in FIG. 6 does 1-to-N (Point-to-Multipoint: Point to Multipoint) conversion of common Ethernet and SONET path, and provides a 1 gigabit Ethernet card 10e, optical-electric conversion part 10d, branching processing part 20, 1st STS interface part (STSINF-R) 10a, 2nd STS interface part (STSINF-T) 10b, Ethernet interface multiplexing part 30 and selector 10c.

Here, a $1^{st}$ STS interface part 10a maps Ethernet frames that have frame forms like, for example, STS-3c (150 Mbps) and STS-12c (600 Mbps) for payload of STS frames like STS-1, and has a plurality of STS frame conversion circuits (omitted from figures). The transmission capacity between these STS frame conversion circuits and a plurality of switch fabrics 12 (refer to FIG. 5) is at 2.5 Gbps (2488.32 Mbps), physically, being at 2.4 Gbps for a payload segment with overhead eliminated (Corresponding to the OC-48 section).

Here, STS-1 has a path of 38 parts, physically, and STS-1 can be used as STS-3c (STS-1×3 concatenation [coupling]) by using 3. Further, STS-1 corresponds to 52 Mbps and STS-3c corresponds to 156 Mbps.

Thus, the 1st STS interface part 10a isolates a frame address destination corresponding to VLANID and the Ethernet frame is mapped for the payload of the STS frames like STS-1 or STS-3c, STS-12c for, respectively, the isolated, for example, 3 paths.

Thus, for example, 3 STS paths are allotted between the switch part (STS-SW) 15 that is shown in FIG. 5, and the Ethernet interface part 10. Thus, the switch fabric (STS-SF) 12 multiplexes and adds (Add) the STS path of each Ethernet interface part 10 to ring transmission circuit 50f.

Also, each ADM node 50a~50d (refer to FIG. 1) is selected by a selector 10c for a SONET frame of the local address from the ring transmission circuit 50f, the selected SONET frame is dropped in the 2nd STS interface part 10b and the dropped SONET frame is input into the Ethernet interface multiplexing part 30.

Further, a 1 gigabit Ethernet card 10e (refer to FIG. 6) is an interface card that transmits and receives Ethernet frames. The optical-electrical conversion part 10d uses, for example, a gigabit Ethernet in one embodiment, and is an optical interface like a 1000 Base-SX or 1000 Base-LX. Also, ones like electric 1000 Base-T can be used.

(7-1) Constitution of Branching Processing Part 20 of Ethernet Interface Part 10

Branching processing part 20 is one that encapsulates the Ethernet frames from the optical-electrical conversion part 10d, and provides a 1st physical terminal part 20a wherein an input plurality of Ethernet frames physical layers terminate, 1st frame terminal part 20b wherein terminated Ethernet frame MAC layer, which 1st physical terminal part 20a terminated, is terminated, a plurality of multiplexing parts 17 that multiplex Ethernet frames having a specific VLANID corresponding to a specific STS path ID that are held in register 11a among an input plurality of Ethernet frame VLANID's, and detection part 19a that detects Ethernet frame transmission breaks.

A plurality of multiplexing parts 17 are established corresponding to STS path ID, respectively, and establish filtering part 17a, buffer 17b, encapsulating part 17c, ID inserting part (ID-INS) 17d and flag inserting part (ID-INS) 17e. Here, filtering part 17a passes through Ethernet frames having a specific VLANID among a plurality of Ethernet frames. This filtering function is realized by hardware like LSI, for example. Further, buffer 17b temporarily holds Ethernet frames that pass through filtering part 17a.

Also, encapsulating part 17c encapsulates information data that is contained in an Ethernet frame (MAC frame) that passes through filtering part 17a. Further, the actual information data that is contained in the MAC frame is extracted.

(7-2) Ethernet Frame Format

Insertion of VLANID by ID inserting part 17d is performed by the side that transmits the Ethernet frame that contains this VLANID. In FIG. 4, for example, the LAN switch 42a inserts a VLANID in an Ethernet frame that LAN switch 42a transmits to server 41, further, server 41 inserts a VLANID (VLAN Protocol Identifier) for an Ethernet frame that server 41 transmits to LAN switch 42a.

Figure 7:
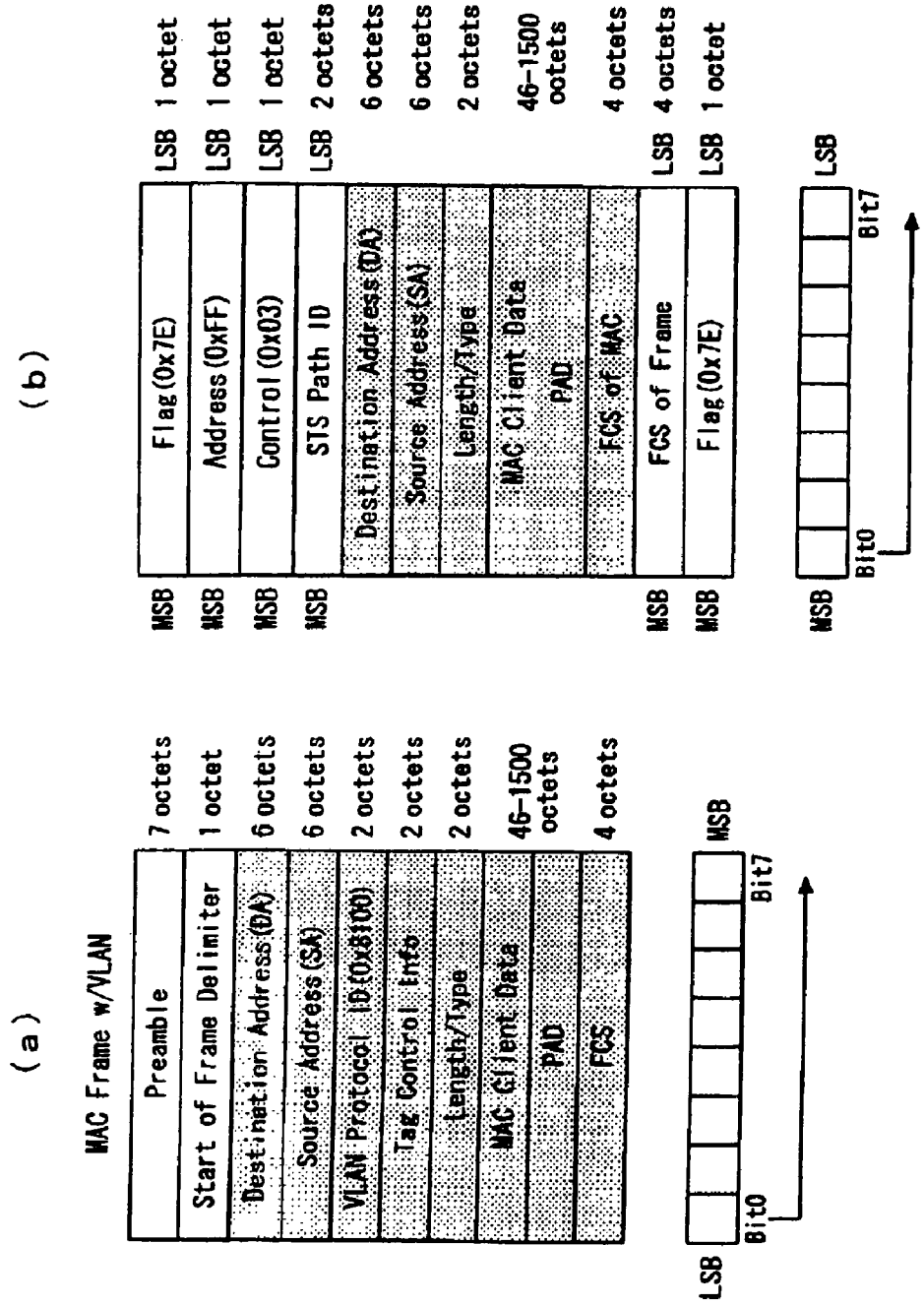
FIG. 7(a) is a diagram showing an exemplary Ethernet frame format.
FIG. 7b is a diagram showing an exemplary SONET frame format.
Figure 8:
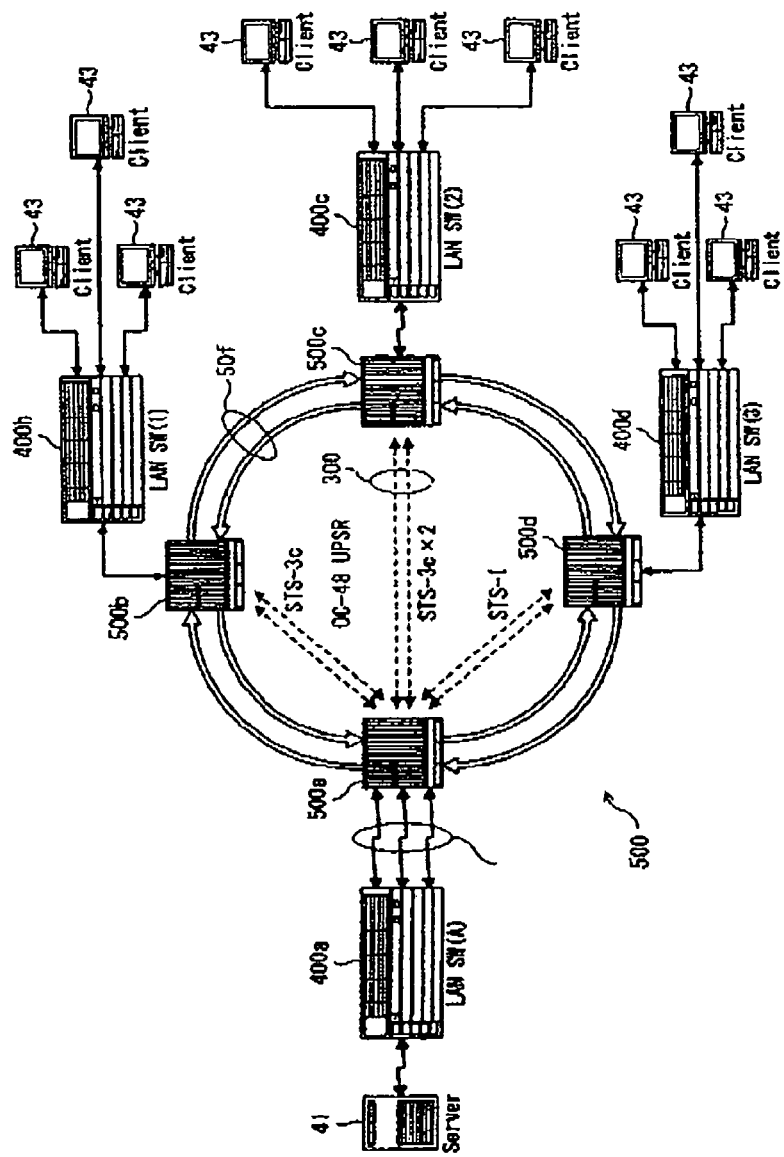
FIG. 8 is a schematic structural diagram of an exemplary Ethernet-Over-SONET system.
Figure 9:
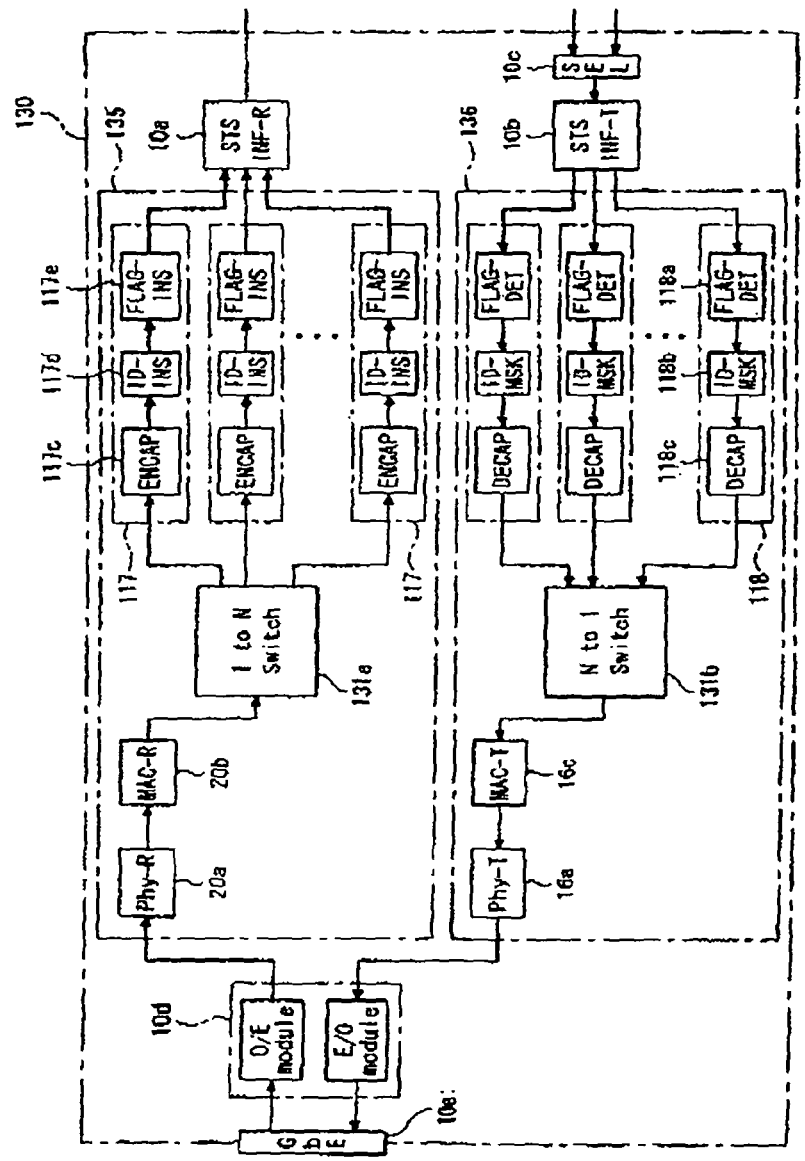
FIG. 9 is a block diagram of an exemplary Ethernet-Over-SONET interface during L2 switch utilization.

FIG. 7(a) is a diagram that shows an Ethernet frame format according to the present invention. An Ethernet MAC frame that is shown in this FIG. 7(a), the VLANID is written into the actual data region. Further, a virtual path concept is introduced to MAC frames without connection concepts by this by having a transmission destination address (Destination Address) and transmission source address (Source Address) along with VLANID. Also, ADM nodes 50a~50d can offer connection type service and security is reliable for each connection.

Also, other than things like VLANID, respective regions of preamble (Preamble), start of frame [delimiter] (Start of frame Delimiter), tag control information (Tag Control Info), length or type (Length or Type), MAC client data (MAC client Data), Pad region (PAD) and error detection bit (FCS) are established in this Ethernet frame, and common packet communication is also supported. Also, prior protocols can be used as is, further, universal communication can be carried out without accompanying design alterations to each type of client terminal 43 and device.

Further, an octet (Octet) displays 8 bits and the MSB (Most significant Bit) and LSB (Least Significant Bit), respectively, display the highest position bit and lowest position bit.

(7-3) ID Inserting Part 17d

In one embodiment, ID inserting part 17d (refer to FIG. 6) inserts each opposing ADM node 50b~50d STS path ID of the frame receiving destination other than a local one that opposes Ethernet frames (MAC frames) that area encapsulated by encapsulating part 17c. Ethernet frame data that has been converted to a SONET frame by inserting each STS path ID can be reliably transmitted to opposing ADM nodes ADM 50b~50d. Further, the opposing ADM nodes 50b~50d identify the received frame by filtering only ones having an indicated VLAN port ID for Ethernet frames that are contained in the received SONET frames.

In one embodiment, the flag inserting part 17e inserts a flag that indicates an input side transmission fault of an Ethernet frame for an Ethernet frame (MAC frame) that is encapsulated by encapsulating part 17c. This flag is inserted during encapsulating of a frame and the faults of the Ethernet that are generated in ADM node 50a of the transmitting side are common to the opposing ADM nodes 50b~50d.

Ethernet frames that are multiplexed from the 1 gigabit Ethernet card 10e can be multicast in a plurality of multiplexing parts 17 corresponding to STS path ID. The multiplexed Ethernet frame is multiplexed in, for example, N types of STS path ID's. Thus, the multicast Ethernet frames, respectively, are input to multiplexing part 17.

Here, when looking at 1 multiplexing part 17, a multicast Ethernet frame is identified in filtering part 17a that defines the VLANID, and only frames that are uniform with the ID of filter-use with VLANID held in a register pass through this filtering part 17a. Further, the filtering part 17a breaks down the frame when the filter-use VLANID and frame VLANID differ. Thus, each MAC frame in encapsulating part 17c is encapsulated and opposing ADM nodes 50b~50d STS path ID's are imparted by ID inserting part 17d. Further, multiplexing part 17 recognizes a fault that is generated due to detecting part 19a and a flag is inserted in MAC frame in flag inserting part 17e when a fault is generated on the 1 gigabit Ethernet interface 103 side.

Thus, N types of multiplexing part 17, respectively, output Ethernet frames with an STS path ID imparted. Further, multiple Ethernet frames that are output from the 1 gigabit Ethernet interface 10e side are isolated by each path of N types and mapped by SONET frame by a 1st STS interface part 10a after this isolation. Further, whether there is multiplexing of any path of the line side is established in switch fabric 12 after isolation by each path, and transmitted via ring transmission circuit 50f.

Thus, multiplexed MAC frames are isolated by STS path ID by filtering based on VLANID in a prior step of encapsulating part 17c and converted to SONET frames after adding a port ID and flag.

(7-4) SONET Frame Format

FIG. 7(b) is a diagram showing a SONET frame format according to the present invention. A SONET frame that is shown in this FIG. 7(b) has STS path ID, flag (Flag), address (Address) and control information (Control) inserted, further, things like length or type (Length or Type), MAC client data (MAC Client Data), pad region (PAD and error detecting bit (FCS) that are contained in a MAC frame are mapped for a SONET frame.

Further, the SONET path has a 1-to-1 connection with the transmitting side device or client terminal 43, receiving side device or client terminal 43 and each SONET path is assigned 1 ID.

(7-5) Selector 10c and 2nd STS Interface Part 10b

Selector 10c (refer to FIG. 6) selects the local address among Ethernet frames that are multiplexed from switch fabric 12. Further, 2nd STS interface part 10b isolates the multiplexed Ethernet frames that are selected by selector 10c and outputs the isolated Ethernet frames to Ethernet interface multiplexing part 30.

(7-6) Constitution of Ethernet Interface Part 10

Ethernet interface multiplexing part 30 establishes a plurality of isolating parts 18, Ethernet multiplexing part 30a, 2nd frame terminal part 30b, 2nd physical terminal part 30c and logic circuit 30d.

Isolation part 18 extracts each Ethernet frame and SONET frame STS path ID from frames that are converted to electrical Ethernet frames by selection by switch fabric 12 (refer to FIG. 5) among SONET frames with a plurality of Ethernet frames multiplexed, and imparts a VLANID corresponding to STS path ID that is held in register 11b (refer to FIG. 5) to an extracted plurality of Ethernet frames.

This isolating part 18 establishes a detecting part 18a that detects a flag that is contained in a SONET frame, an ID detecting part (ID-MSK [ID-Mask]) 18b that passes through only Ethernet frames having a specific VLANID based on a STS path ID that is contained in a SONET frame and a specific[sic] VLANID that is held in register 11b, a decapsulating part 18c that decapsulates a SONET frame having a detected VLANID, a buffer 18d that temporarily holds an Ethernet frame that is decapsulated by decapsulating part 18c, and a flag holding part 18e (This flag holding part 18e is also desirable as being established in flag detecting part 18a.) that holds a flag that is detected by flag detecting part 18a.

Thus, along with 1st ADM node 50a~50d multiplexing part 17 inserting a flag that indicates an input side Ethernet frame fault, 2nd ADM node 50a~50d isolation part 18 prevents output of Ethernet frames that should be transmitted by flag detection from electric Ethernet frames that are converted received SONET frames.

Also, Ethernet multiplexing part 30a multiplexes a plurality of Ethernet frames that are imparted by isolation part 18 to an Ethernet interface. Further, the encapsulated Ethernet frames are multiplexed in the Ethernet interface.

Further, 2nd frame terminal part 30b processes transmission of MAC layers for Ethernet frames that are encapsulated by Ethernet interface multiplexing part 30. Further, logic circuit 30d is an OR circuit and inputs the OR of the flag holding part 18e to 2nd physical terminal part 30c by connecting with, for example, bit 1 or 0 which indicated whether or not there is a flag held in flag holding part 18e. Also, 2nd physical terminal part 30c processes physical layers for Ethernet frames that are processed by 2nd frame terminal part 30b, also, performs circuit control relative to whether or not there is a fault flag. 2nd physical terminal part 30c circuit control prevents (shut down) frame transmission from the 1 gigabit Ethernet card 10e when an OR from logic circuit 30d indicates there is a flag.

Thus, Ethernet frames are encapsulated in opposing ADM nodes 50b~50d. At this time, a STS path ID is inserted for each opposing ADM node 50b~50d SONET path due to data that is converted to SONET frames being actually transmitted to opposing ADM nodes 50b~50d and SONET frames are transmitted.

Thus, opposing ADM node 50b~50d Ethernet interface multiplexing part 30 identifies received frames such as passing through only an indicated VLAN port ID. Also, Ethernet interface multiplexing part 30 removes both the port ID and flag from the electrical Ethernet frame which is obtained by converting SONET frames, and frames that have removal of the encapsulation are converted to Ethernet frames and are multiplexed and transmitted to gigabit Ethernet interface 10e.

A flag is imparted that indicates the Ethernet side input is shut down by flag inserting part 17e, and input to an ADM node of any of opposing ADM nodes 50b~50d. Thus, opposite side Ethernet interface multiplexing part 30 automatically shuts down the Ethernet side output when there is detection of an inserted flag by detection by flag detecting part 18a. However, this is transmitted as is when a flag is not inserted.

(7-7) Frame Transmission System 99 of the Present Invention

A frame transmission system 99 of the present invention is provided with ADM nodes 50a~50d having an Ethernet interface part 10 and switch fabric 12. Thus, along with ADM node 50a among ADM nodes 50a~50d being constituted by establishing register 11a that holds Ethernet frame VLANID and SONET frame STS path ID in opposition, and multiplexing part 17 that multiplexes a plurality of Ethernet frames having VLANID that correspond to a STS path ID held in register 11a among the input plurality of Ethernet frame VLANID's, ADM node 50b among ADM nodes 50a~50d establishes a register 11b that holds SONET frame STS path ID and Ethernet frame VLANID in opposition, and isolation part 18 that impart a VLANID corresponding to an STS path ID that is held in register 11b for each extracted Ethernet frame by extracting each Ethernet frame and SONET frame STS path ID from frames originating in SONET frames. Also, register 11a and register 11b hold identical capacities.

(8) Utilization Explanation

VLANID filtering and frame transmission methods to SONET paths for frame transmission system 100 of one embodiment of the present invention, as previously mentioned, are further explained.

A frame transmission method of the present invention is a frame transmission method for a Ethernet frame and SONET frame convertible interface device 10 which is shown in FIG. 6, for example. Interface device 10 multiplexes and passes through Ethernet frames in the transmission-use SONET frame STS path ID region by passing through Ethernet frames having a specific VLANID among a plurality of Ethernet frames by input of a plurality of Ethernet frames.

Thus, the Ethernet frames are reliably transmitted to the objective corresponding transmission devices, and the hardware load decreases due to address learning being unnecessary for LAN switches 42a~42d. Device mechanisms are simplified, providing improvement of properties of the Ethernet interface part 10.

A frame transmission method of the present invention receives a SONET frame with a plurality of Ethernet frames multiplexed, extracts each Ethernet frame and SONET frame STS path ID from electrical Ethernet frames that are converted multiplexed SONET frames and imparts a VLANID corresponding to the extracted STS path ID to each extracted Ethernet frame. Thus, the reliability is improved for the device by an output shut-down function when there is a fault.

Further, respectively, VLANID=1, VLANID=2 and VLANID=3 are imparted in the Ethernet MAC frames for ADM node 50a that is connected to LAN switch 42a in FIG.

1. A STS path ID is identified by a VLANID that is inserted in the header by encapsulation in a SONET frame after filtering by VLANID in the ADM nodes 50a~50d. In FIG. 1, the frame of VLANID=1 (data A) is transmitted to LAN switch 42b through STS path ID=1 path (STS-3c). Likewise, the frame of VLANID=2 (data B) is transmitted to LAN switch 42c through STS path ID=2 path (STS-3c×2) and the frame of VLANID=3 (data C) is transmitted to LAN switch 42d through STS path ID-3 path (STS-1).

Further, a VLANID that is written into the Ethernet frame is identified and only frames having a VLANID that is identical to the indicated STS path ID is mapped.

In this way, a frame can be reliably received by LAN switches 42a~42d. Also, each ADM nodes 50a~50d uses only a VLANID within each data frame without MAC address learning, and a MAC frame can be branched to each port. In this way, 1-to-N transmission becomes possible.

(B) Other

The present invention is not limited to the above-mentioned preferred embodiment and can be executed with various modifications within a scope which does not deviate from the essentials of the present invention.

For example, the present frame transmission system 99 can use a dual homing system (dual homing). A ring transmission circuit 50f between each ADM node 50a~50d is a network structure that has, for example, 4 (2 pairs) of 2 (1 pair) optical fibers comprised of the rise and fall with this dual homing system.

Concretely, 2 (1 pair) LAN switches (master LAN switch and slave LAN switch) are established on the ADM node 50a~50d side for an Ethernet interface part 10. These LAN switches function, respectively, as in-use and reserve-use.

Ordinarily, information data can be transmitted using an in-use path and a control management-use SONET frame can be transmitted using a reserve-use path. Thus, the master LAN switch and slave LAN switch are switched to, mutually, slave LAN switch and master LAN switch when a fault is generated in any of the ring transmission circuits 50f.

In this way, appropriate transmission protection becomes possible by preventing breaking of in-use Ethernet frames. Otherwise, SDH can be used instead of SONET for the above-mentioned actual conditions.

Further, unifying of the SONET multiplex isolation device and LAN switch is also desirable. For example, things like the number of ADM nodes and number of client terminals 43 are not limited to the above-mentioned and can be realized using various values.

Although the present invention has been described with reference to particular embodiments, it will be understood to those skilled in the art that the invention is capable of a variety of alternative embodiments within the spirit of the appended claims.

The invention claimed is:

1. An interface device, comprising:
 an Ethernet frame and a synchronous optical network frame convertible interface device, wherein a $1^{st}$ holding part with a VLAN identifier of said Ethernet frame and a path identifier of said synchronous optical network frame are placed opposite each other; and
 a plurality of multiplexers of the interface device, each of which can be established corresponding to a path identifier of said synchronous optical network respectively and each of which is operable to multiplex an Ethernet frame having said specific VLAN identifier corresponding to said specific path identifier that is held by said $1^{st}$ holding part among a plurality of input Ethernet frame VLAN identifiers;
 wherein said each multiplexer establishes a filtering part that passes through Ethernet frames having said specific VLAN identifier among a plurality of Ethernet frames and a $1^{st}$ encapsulating part that encapsulates information data contained in an Ethernet frame that passes through a filtering part, and said filtering part breaks down the frame when a VLAN identifier of the frame is different from any one of the VLAN identifiers that is held by said holding part.

2. The interface device according to claim 1, wherein the multiplexer establishes an ID inserting part that inserts an opposing synchronous optical network transmission device path identifier that opposes an Ethernet frame that is encapsulated by a $1^{st}$ encapsulating part.

3. A transmission system, comprising:
 a plurality of synchronous optical network multiplex and demultiplex devices having Ethernet interface devices and synchronous optical network interface devices established, wherein a $1^{st}$ synchronous optical network multiplex and demultiplex device among the plurality of synchronous optical network multiplex and demultiplex devices establishes a $1^{st}$ holding part with an Ethernet frame specific VLAN identifier and a synchronous optical network frame specific path identifier placed opposite each other;
 a plurality of multiplexers, each of which is established corresponding to a path identifier respectively and each of which can be operable to multiplex a plurality of Ethernet frames having a specific VLAN identifier corresponding to the specific path identifier that is held in the $1^{st}$ holding part among an input plurality of Ethernet frame VLAN identifiers, along with a $2^{nd}$ synchronous optical network multiplex and demultiplex device among the plurality of synchronous optical network multiplex and demultiplex devices with a $2^{nd}$ holding part with the synchronous optical network frame specific path identifier and Ethernet frame specific VLAN identifier placed opposite each other; and
 a demultiplexer that imparts a VLAN identifier corresponding to the path identifier that is held in the $2^{nd}$ holding part to each extracted Ethernet frame by extracting each Ethernet frame and the synchronous optical network frame path identifier from a frame originating in the synchronous optical network frame;
 wherein the $1^{st}$ multiplex and demultiplex device multiplexer multiplexing part inserting a flag that indicates an input side Ethernet frame transmission fault along with the $2^{nd}$ synchronous optical network multiplex and demultiplex device that prevents output of an Ethernet frame that is transmitted by detection of the flag from a frame originating in the synchronous optical network frame;
 a filtering part that breaks down a frame when a VLAN identifier of the frame is different from any one of the VLAN identifiers that is held by the holding part.

* * * * *